(12) United States Patent
Akyol (10) Patent No.: US 8,320,249 B2
(45) Date of Patent: Nov. 27, 2012

(54) METHOD AND SYSTEM FOR CONTROLLING NETWORK ACCESS ON A PER-FLOW BASIS

(75) Inventor: Bora Akyol, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 304 days.

(21) Appl. No.: 11/682,966

(22) Filed: Mar. 7, 2007

(65) Prior Publication Data

US 2008/0219162 A1 Sep. 11, 2008

(51) Int. Cl.
*H04L 1/00* (2006.01)

(52) U.S. Cl. ........ 370/235; 370/231; 370/232; 709/224; 726/22; 726/23

(58) Field of Classification Search ........... 370/329, 370/330, 389, 392, 395.2, 395.21, 229, 231, 370/232, 235–237, 241, 245, 250, 252; 726/22, 726/23; 709/220–224, 227, 228
See application file for complete search history.

(56) References Cited

U.S. PATENT DOCUMENTS

| | | | | |
|---|---|---|---|---|
| 5,541,987 A * | 7/1996 | Topper et al. | | 379/230 |
| 6,381,242 B1 * | 4/2002 | Maher et al. | | 370/394 |
| 6,389,468 B1 * | 5/2002 | Muller et al. | | 709/226 |
| 6,654,373 B1 * | 11/2003 | Maher et al. | | 370/392 |
| 6,718,380 B1 * | 4/2004 | Mohaban et al. | | 709/223 |
| 7,006,472 B1 * | 2/2006 | Immonen et al. | | 370/332 |
| 7,043,759 B2 * | 5/2006 | Kaashoek et al. | | 726/25 |
| 7,061,861 B1 * | 6/2006 | Mekkittikul et al. | | 370/230 |
| 7,095,715 B2 | 8/2006 | Buckman | | |
| 7,411,957 B2 * | 8/2008 | Stacy et al. | | 370/392 |
| 7,443,858 B1 * | 10/2008 | Cheriton et al. | | 370/395.1 |
| 7,453,892 B2 | 11/2008 | Buskirk | | |
| 7,460,038 B2 * | 12/2008 | Samuels et al. | | 341/87 |
| 7,492,713 B1 * | 2/2009 | Turner et al. | | 370/231 |
| 7,808,898 B2 * | 10/2010 | Eswaran et al. | | 370/230 |
| 2002/0097726 A1 * | 7/2002 | Garcia-Luna-Aceves et al. | | 370/395.31 |
| 2003/0046577 A1 * | 3/2003 | Silverman | | 713/200 |
| 2004/0093521 A1 * | 5/2004 | Hamadeh et al. | | 713/201 |
| 2004/0128498 A1 * | 7/2004 | Lang et al. | | 713/153 |
| 2004/0141462 A1 * | 7/2004 | Mistry et al. | | 370/229 |
| 2005/0138238 A1 | 6/2005 | Tierney | | |
| 2005/0213570 A1 * | 9/2005 | Stacy et al. | | 370/389 |
| 2006/0028983 A1 * | 2/2006 | Wright | | 370/230 |
| 2006/0077964 A1 * | 4/2006 | Wu et al. | | 370/352 |
| 2006/0224759 A1 * | 10/2006 | Fang et al. | | 709/231 |
| 2007/0091800 A1 * | 4/2007 | Corcoran | | 370/230 |
| 2008/0101234 A1 * | 5/2008 | Nakil et al. | | 370/235 |

(Continued)

*Primary Examiner* — Hassan Phillips
*Assistant Examiner* — Ajay Cattungal
(74) *Attorney, Agent, or Firm* — Thomas|Horstemeyer, LLP (57) ABSTRACT

Aspects of a method and system for controlling network access on a per-flow basis may comprise controlling access to a network by regulating at least one flow comprising one or more ingress packets based on a flow identifier associated with said one or more packets and based on an establishment of flows in said network. The flow identifier may comprise a source IP address, a destination IP address, a source MAC address, a destination MAC address, a network protocol, a source port number, and/or a destination port number. The number of flows permitted for a source and/or a rate at which a source is allowed to establish new flows may be limited. Flows that exceed one or more of these limits may be marked for further processing. Access to the network for the marked flows may be determined based on past and/or present network statistics. Flows received when a node is at capacity may also be marked for processing.

29 Claims, 4 Drawing Sheets

U.S. PATENT DOCUMENTS

2008/0159135 A1* 7/2008 Caram .......................... 370/230
2008/0163333 A1* 7/2008 Kasralikar .................... 726/1
2008/0189769 A1* 8/2008 Casado et al. ................. 726/4
2011/0242981 A1* 10/2011 Mistry et al. ................. 370/235

* cited by examiner

METHOD AND SYSTEM FOR CONTROLLING NETWORK ACCESS ON A PER-FLOW BASIS

CROSS-REFERENCE TO RELATED APPLICATIONS/INCORPORATION BY REFERENCE

Not applicable

FIELD OF THE INVENTION

Certain embodiments of the invention relate to computer networking. More specifically, certain embodiments of the invention relate to a method and system for controlling network access on a per-flow basis.

BACKGROUND OF THE INVENTION

A computer network is a collection of two or more computing nodes, which are communicatively coupled via a transmission medium and utilized for transmitting information. Most networks adhere to the layered approach provided by the open systems interconnect (OSI) reference model. The OSI reference provides a seven (7) layer approach, which includes an application layer, (Layer 7), a presentation layer (layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. Some networks may utilize only a subset of 7 layers. For example, the TCP/IP model, or Internet Reference model generally utilizes a fiver layer model, which comprises an application layer, (Layer 7), a transport layer (Layer 4), a network layer (Layer 3), a data link layer (Layer 2) and a physical layer (Layer 1). These five layers can be broken down into a fairly specific set of responsibilities or services, which they provide.

Layer 7, the application layer, is typically responsible for supporting network applications such as web browsers and email clients, and is typically implemented in software in end systems such as personal computers and servers. Typical layer 5 protocols comprise HTTP to support the World Wide Web, and SMTP to support electronic mail.

Layer 6, the presentation layer, is typically responsible for masking any differences in data formats that may occur between dissimilar or disparate systems. The presentation layer specifies architecture independent data transfer formats and may enable encoding, decoding, encryption, decryption, compression and/or decompression of data.

Layer 5, the session layer, is typically responsible for managing user session dialogues. In this regard, the session layer may be enabled to control establishment and/or termination of logical links between users. The session layer may also be enabled to provide handling and reporting of upper layer errors.

Layer 4, the transport layer, is typically responsible for passing application layer messages between the client and server sides of an application. In this regard, the transport layer may be enabled to manage end-to-end delivery of messages in the network. The transport layer may comprise various error recovery and/or flow control mechanisms, which may provide reliable delivery of messages. By far the two most common Layer 4 protocols are transmission control protocol (TCP) and user datagram protocol (UDP), which are used in the Internet.

Layer 3, the network layer, is typically responsible for determining how data may be transferred between network devices. Data may be routed according to unique network addresses. In this regard, the network layer may route, for example, datagrams between end systems. Internet Protocol (IP), for example, defines the form and content of the datagrams and is implemented in Layer 3 in combination with any number of routing protocols which may be implemented in the various nodes (devices such as bridges and routers) along a datagram's path from one end system to another.

Layer 2, the data link layer, is typically responsible for moving a packet of data from one node to another. The data link layer defines various procedures and mechanisms for operating communication links and may enable, for example, the framing of packets within the network. The data link layer may enable detection and/or correction of packet errors. The Ethernet (IEEE 802.3) protocol is one common link layer protocol that is used in modern computer networks.

Layer 1, the physical layer, is typically responsible for defining the physical means, which may comprise optical, electrical and/or mechanical means for communicating data via network devices over a communication medium. The converting the bit stream from Layer 2 into a series of physical signals for transmission over a medium. Layer 2 technologies such as Ethernet may implement a number of Layer 1 protocols depending on whether the signal is to be transmitted over twisted-pair cabling or over-the-air for example.

As computer networks are increasingly relied upon for providing reliable and secure transmission of sensitive data between hosts, the types of security features and number of security features in network equipment has increased in an effort to provide the desired security and reliability.

The reliability and security of a network may take many forms. However, one pervasive threat to network reliability and security is the spread of malware into a network. Malware is a computer program or code written with the intention of infiltrating and/or damaging an end system such as a personal computer or a server. Particularly harmful to computer networks is malware known as a worm. Worms are self-replicating, often malicious, programs that spread from end-system to end-system in a computer network. In many instances a worm will replicate and spread as quickly as possible with the goal of infecting as many end-systems as possible.

Traditionally security features operating at the Layers 3, 4, and 5 described above, have had limited success stopping the spread of malware in computer networks. Furthermore, conventional approaches for improving network reliability and network security are often time and/or CPU intensive and often leave networks vulnerable at the lower layers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for controlling network access on a per-flow basis, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for controlling network access on a per-flow basis. Exemplary aspects of the invention may comprise controlling access to a network by regulating at least one flow comprising one or more ingress packets based on a flow identifier associated with said one or more packets, and based on the establishment of flows in the network. For example, based on observed trends in the establishment of flows, access to the network may be controlled. The flow identifier may comprise a source IP address, a destination IP address, a source MAC address, a destination MAC address, a network protocol, a source port number, and/or a destination port number. The number of flows permitted for a source and/or a rate at which a source is allowed to establish new flows may be limited. Flows that exceed one or more of these limits may be marked for further processing. Access to the network for the marked flows may be determined based on past and/or present network statistics. Flows received when a node is at capacity may also be marked for processing.

Aspects of the invention may enable receiving and identifying data flows in a network and either granting or denying each data flow access to the network based on a variety of network statistics, which may comprise the number of flows originating from a source and the rate at which a source is establishing new flows. In one embodiment of the invention, a flow may comprise one or more Ethernet packets, which have the same flow identifier. The flow identifier may comprise source and destination addresses, protocol types, and port numbers.

Figure 1A:
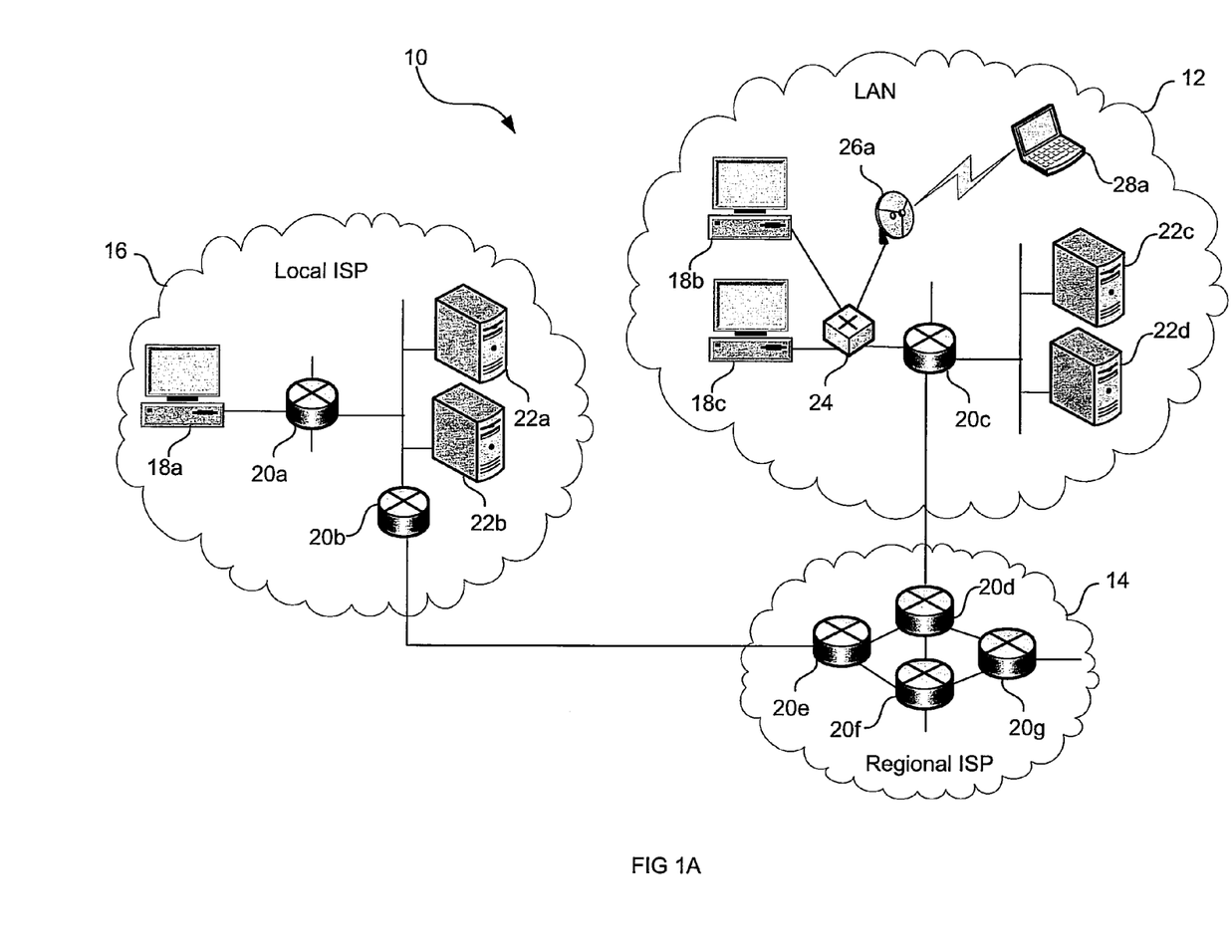
FIG. 1A is a diagram of an exemplary network in which access may be controlled on a per-flow basis, in accordance with an embodiment of the invention.

FIG. 1A is a diagram of an exemplary network in which access may be controlled on a per-flow basis, in accordance with an embodiment of the invention. Referring to FIG. 1A, the exemplary network 10 may comprise a local area network 12, a regional internet service provider (ISP) 14, and a local ISP 16. Each of the local area network 12, the regional ISP 14, and the local ISP 16 may comprise any number of network nodes communicatively coupled to exchange information and exemplary nodes may comprise computers 18, wireless terminals 28, servers 22, routers 20, switches 24, and wireless access points 26. In this regard, any of the network nodes may be susceptible to a malicious attack and may thus benefit from controlling access to the network on a per-flow basis. The switches 24 may be Layer 2 (L2) switches.

Figure 1B:
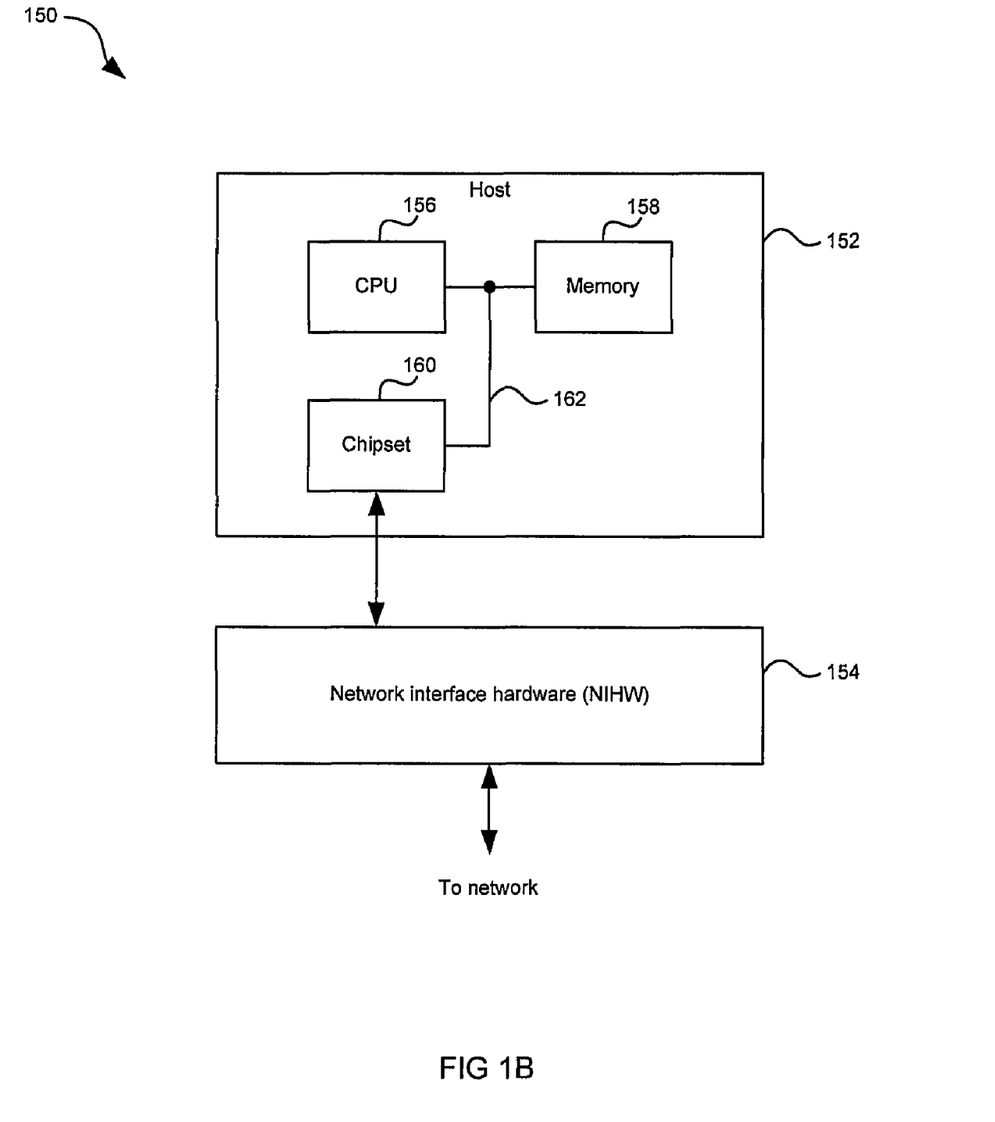
FIG. 1B is a block diagram illustrating a host with a separate network interface hardware (NIHW) block, in accordance with an embodiment of the invention.

In an exemplary situation, the computer 18c may become infected with a worm which may try to replicate and spread to other nodes in the network. In this example, if the switch 24 is configured to control access to the network on a per-flow basis, the switch 24 may be able to stop any infected flows from reaching the router 20c, while still allowing uninfected flows to pass to router 20c. In this regard, the switch 24 may first identify and drop any packet that may be determined to be an undesired packet, for example, a spoofed packet, by utilizing a MAC address to IP address binding database. The switch 24 may also be enabled to extract a unique identifier from any ingress packets and may utilize a database to keep track of the packets that have arrived at the switch 24. Furthermore, the switch 24 may utilize the identifier to regulate the packets allowed to pass through it FIG. 1B is a block diagram illustrating a host with a separate network interface hardware (NIHW) block, in accordance with an embodiment of the invention. Referring to FIG. 1B, there is shown a networking system 150, such as a server, a client, or a similar network machine, for example, that may comprise a host 152 and a network interface hardware (NIHW) device 154. The host 152 may comprise a central processing unit (CPU) 156, a memory 158, and a chipset 160. The CPU 156, the memory 158, and the chipset 160 may be communicatively coupled via, for example, a bus 162.

The networking system 150 may enable operation or support of various networking protocols. For example, the networking system 150 may enable supporting of transport control protocol/Internet protocol (TCP/IP) connections. In this regard, the networking system 150 may enable supporting of Internet control message protocol (ICMP), the Address Resolution Protocol (ARP), stream control transmission protocol (SCTP), and/or path maximum transmission unit (PMTU) discovery protocol, for example. The ICMP protocol may refer to an ISO/OSI layer 3 protocol that may allow routers, for example, to send error and/or control messages about packet processing on IP networks. The ARP protocol may refer to a low-level protocol within the TCP/IP suite that may map IP addresses to corresponding Ethernet addresses. The SCTP may support the transport of public switched telephone networks (PSTN) signaling messages over connectionless packet networks such as IP networks, for example. The PMTU may refer to a maximum unit of data that may be sent given a physical network medium. In other embodiments, SCTP may be used as the transport protocol rather than TCP. Malicious packets, utilizing one or more of the protocols described above for example, may attempt to gain entry to the system 150 and, if successful, may rapidly spread to other nodes in the network.

The host 152 may enable setup parameters for network connections. For example, the host 152 may setup transport layer parameters comprising information that support time stamping, window scaling, delayed acknowledgment policy, flow control scheme to be used, congestion handling, selective acknowledgement (SACK), buffers to be used, and/or other transport related parameters. The host 152 may also setup network layer parameters comprising information that supports IPv4 or IPv6, for example, and options such as no fragments and/or hop limit. The host 152 may also setup data link layer parameters comprising information that supports virtual local area networks (VLAN) and source address to be used, for example. In instances when the system 150 may be infected with a worm or virus, for example, the host 152 may operate to enable the transmission of malicious packets into the network. In accordance with an embodiment of the invention, the host 152 may identify and drop any packet that may be determined to be infected or otherwise undesired.

The CPU 156 may comprise suitable logic, circuitry, and/or code that may enable supporting of the management and/or performance of networking operations associated with remote peers or clients on a network. The CPU 156 may also enable supporting of the management and/or performance of service applications that may be provided to the remote clients on the network. The CPU 156 may also enable protection of sensitive resources.

The memory 158 may comprise suitable logic, circuitry, and/or code that may enable storage of information regarding the networking operations and/or service applications supported by the CPU 156. The chipset 160 may comprise suitable logic, circuitry, and/or code that may enable supporting of memory management, PCI master and arbitrator, graphics interface, I/O master for USB, audio, and/or peripheral devices, for example. In this regard, the chipset 160 may comprise at least one integrated circuit (IC) that provides services in support of the CPU 156 operations. In some instances, the services provided by the chipset 160 may be implemented in separate ICs. The choice of one or more ICs for implementing the chipset 160 may be based on the number and/or type of services provided.

The NIHW device 154 may comprise suitable logic, circuitry, and/or code that may enable communication with the host 152. In this regard, the NIHW device 154 may enable communication with the CPU 156, the memory 158, and/or the chipset 160.

Various embodiments of the invention may enable the system 150 to identify malicious or otherwise undesired packets and preventing them from being forwarded to and by the system 150. This may enable preventing rapid and/or widespread infection of the network.

Figure 1C:
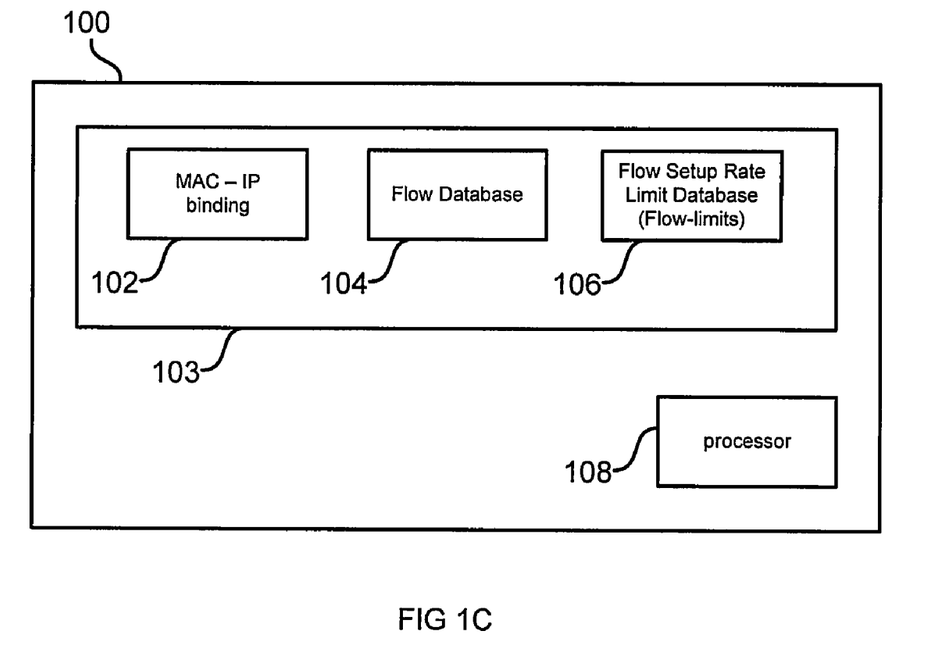
FIG. 1C is a block diagram of a network node in accordance with an embodiment of the invention.

FIG. 1C is a block diagram of an exemplary network node in accordance with an embodiment of the invention. Referring to FIG. 1C, the exemplary node 100 may comprise a MAC address to IP address binding (MAC-to-IP) database 102, a memory 103, a flow-record database 104, a flow-limits database 106, and a processor 108. Exemplary nodes may comprise routers, bridges, or Layer 2 Ethernet switches.

The MAC-to-IP database 102 may comprise a database that may be stored in the memory 103. The MAC-to-IP database 102 may enable the node 100 to store and reference legitimate IP addresses associated with a given MAC address. In one embodiment of the invention, the MAC addresses and corresponding IP addresses assigned statically or assigned by dynamic host configuration protocol (DHCP) may be stored in the MAC-to-IP database.

The memory 103 may comprise suitable logic, circuitry, and/or code that may enable storing one or more of the MAC-to-IP database 102, the flow-record database 104, and the flow-limits database. In one embodiment of the invention the flow-record database may comprise random access memory (RAM) and/or ternary content addressable memory (TCAM). In this regard, although FIG. 1B depicts a single memory block, the invention may utilize any number or combination of machine readable storage elements.

The flow-record database 104 may comprise a database that may be stored in the memory 103. The flow-record database 104 may enable the node 100 to store and reference identifiers for flows that may currently exist in the network. The flow-record database 104 may be utilized to determine whether a packet arriving at the node 100 may be part of an existing flow or may be part of a new flow. In one embodiment of the invention, the identifier for a particular flow may comprise a source IP address, a destination IP address, a source MAC address, a destination MAC address, and a Layer 3 protocol. Furthermore, for port based Layer 3 protocols such as TCP and UDP, the identifier for a particular flow may also comprise a source port number, and a destination port number. In one embodiment of the invention, the flow-record database 104 may be implemented in random access memory (RAM) and/or in ternary content addressable memory (TCAM).

The flow-limits database 106 may comprise a database that may be stored in the memory 103. The flow-limits database 106 may enable the node 100 to store and reference the number of flows (flow-count) allowed for a given source and/or source-type. Additionally, the flow-limits database 106 may enable the node 100 to store and reference information that may be utilized to determine a maximum rate at which a source may establish new flows (flow-setup-rate) for a given source and/or source-type. Examples of a source may comprise a domain, an IP address, or a MAC address and examples of a source-type may comprise a web browser or an email client. In this regard, the flow-limits database 106 may allow a network administrator to implement limits on a flow-count and a flow-setup-rate allowed for a given source/source type. In one embodiment of the invention, the flow-limits database 106 may be implemented in random access memory (RAM) and/or in ternary content addressable memory (TCAM).

The processor 108 may comprise suitable logic, circuitry, and/or code that may enable the processing of flows arriving at the node 100. In this regard, the processor 108 may enable extracting the flow identifier from an incoming packet. Additionally, the processor may interface with one or more of the MAC-to-IP database 102, the flow-record database 104, and the flow-limits database 106. In this regard, the processor 108 may enable storing one or more IP address to MAC address bindings to the MAC-to-IP database 102 and may enable searching the IP-to-MAC address database. The processor 108 may enable storing flow identifiers to the flow-record database 104 and may enable searching the flow-record database 104. The processor 108 may enable storing maximum flow-counts and/or maximum flow-setup-rates to the flow-limits database 106 and may enable searching the flow-limits database. In one embodiment of the invention, the processor may comprise internal RAM or TCAM for storing the MAC-to-IP database 102, the flow-record database 104, and the flow-limits database 106. In another embodiment of the invention, the databases may reside on a different chip or system. In accordance with various embodiments of the invention, a processor utilized for controlling network access on a per-flow basis, such as processor 108, may be integrated within a network node, a network switching device, a network interface card (NIC) or chip, network interface hardware (NIHW), and/or any network routing device within the network 100. For example, in one embodiment of the invention, a processor utilized for controlling network access on a per-flow basis may be implemented in a Layer 2 switch or switching device.

In operation, upon receiving a packet at the network node 100, the processor may extract the packet's flow identifier. Utilizing the source IP address and the source MAC address comprising the extracted flow identifier, the processor 108 may consult the MAC-to-IP database for determining if the packet may be spoofed. The processor 108 makes this determination by comparing the source IP address and source MAC address of the received packet with the IP address to MAC address bindings in the MAC-to-IP database 102, which the processor 108 may populate by monitoring DHCP traffic on the network. If the source IP address and source MAC address extracted from the received packet are not bound in the MAC-to-IP database 102, then the packet may be identified as a spoofed packet. The processor 108 may drop spoofed packets and/or perform further processing of spoofed packets and may implement measures for preventing future spoofed packets. In this manner, the processor 108 may prevent spoofed packets from populating the flow-records database 104 with erroneous and/or malicious flows.

After determining the received packet is not spoofed, the processor 108 may search the flow-record database 104 for the identifier extracted from the received packet. If the received packet's identifier exists in the flow-record database 104, the packet may be identified as being part of an existing flow and may be admitted to the network. If the received packet's identifier does not exist in the flow-record database 104, and the flow-record database 104 is not full, the packet may be identified as representing a new flow and its identifier may be added to the flow-record database 104. If the flow-record database 104 is full when the packet arrives, the processor may mark the packet accordingly for further processing and/or policing in node 100 and/or in another network node.

As stated above, the flow identifier may contain information pertaining to the source of a received packet. Accordingly, when a packet has been identified as being part of a new flow, the processor 108 may search the flow-limits database 106 for the source/source type of the packet. In this manner, the processor 108 may consult the flow-limits database 106 for determining the maximum flow-count and the maximum flow-setup-rate for the source/source-type of the received packet. If the received packet represents a new flow that would exceed one or more of these maximums, then the processor 108 may mark the packet accordingly for further processing/policing in node 100 and/or in another network node.

In one embodiment of the invention, the network node 100 may comprise a Layer 2 Ethernet switch. In this regard, the switch may connect multiple segments of a network, such as the network 10 described in FIG. 1A, and may operate to forward packets between the network segments. In this manner, the Layer 2 Ethernet switch may enable preventing undesired packets from being forwarded from one network segment to another.

Figure 2:
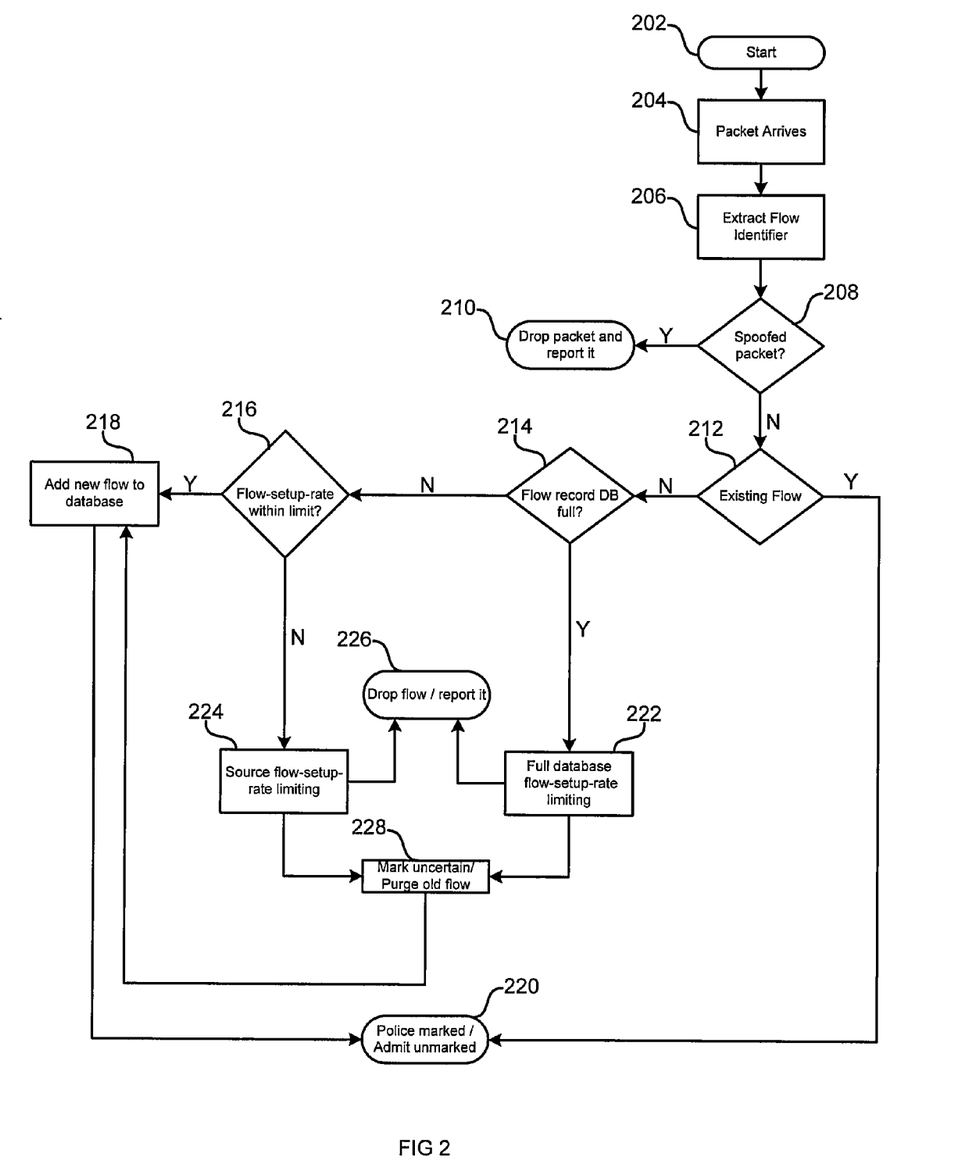
FIG. 2 is a flow chart illustrating exemplary steps that may be utilized for controlling network access on a per-flow basis in accordance with an embodiment of the invention.

FIG. 2 is a flow chart illustrating exemplary steps that may be utilized for controlling network access on a per-flow basis in accordance with an embodiment of the invention. The exemplary steps illustrated in the algorithm may be implemented in software, hardware, or any combination thereof. Referring to FIG. 4, the algorithm begins with step 204 when a packet arrives at a network node, such as the node 100 disclosed in FIG. 1. In step 206, the flow identifier is extracted from the received packet and the algorithm proceeds to step 208.

In step 208 it may be determined whether the packet is valid or if it is spoofed. This determination of whether the packet may be spoofed may utilize a MAC address to IP address binding database, such as the MAC-to-IP database 102 disclosed in FIG. 1. In step 208, if it is determined that the packet is spoofed, then the algorithm may proceed to step 210 where the packet may be dropped and/or may be marked accordingly for further monitoring/policing.

Returning to step 208, if it is determined that the packet is not spoofed, then the algorithm may proceed to step 212 where it may determined if the packet is part of an existing flow. This determination of whether the flow is new may utilize a flow-record database such as the flow-record database 104 disclosed in FIG. 1. In step 212, if the packet is determined to be part of an existing flow, then the algorithm may proceed to step 220 where unmarked packets may be admitted to the network and marked packets may be further processed and/or policed.

Returning to step 212, if it is determined that the packet is not part of an existing flow, then the algorithm may proceed to step 214 where it may be determined if the Flow Record DB utilized in step 212 is full. In step 214, if it is determined that the flow-record database is not full then the algorithm proceeds to step 216 where it may be determined if the source of the packet is below the maximum flow-count and below the maximum flow-setup-rate allowed for the source/source-type. In this regard, the algorithm may utilize a flow-limits database such as the flow-limits database 106 disclosed in FIG. 1. In step 216, if it is determined that the source of the flow is below these maximums, then the algorithm proceeds to step 218 where the identifier of the new flow is added to the flow-record database. In step 218 the flow identifier may be added to the flow-record database and the algorithm may proceed to step 220 where unmarked packets may be admitted to the network and marked packets may be further processed and/or policed.

Returning to step 214, if it is determined that the flow-record database is full, then the algorithm may proceed to step 222. In step 222, it may be determined whether to admit the new flow to the network based on network statistics which may comprise: past and present flow-counts in the network, past and present flow-setup-rates in the network, past and present network bandwidth utilized, and past and present network bandwidth available. In this regard, the algorithm may utilize a flow-limits database such as the flow-limits database 106 disclosed in FIG. 1 to restrict network access for the marked packets while allowing unmarked packets into the network unrestricted. Still in step 222, if it is determined to admit the packet to the network, then the algorithm may proceed to step 228 where the packet may be marked accordingly and an existing entry in the flow-record database may be purged to make room for a new entry; the algorithm then proceeds to step 218.

Returning to step 222, if it is determined to drop the packet, then the algorithm may proceed to step 226 where the packet may be dropped and where the packet may be further processed and/or policed.

Returning to step 216, if it is determined that the source of the packet has exceeded the maximum flow-count and/or the maximum flow-setup-rate for the source/source-type identifier extracted from the packet, then the algorithm may proceed to step 224. In step 224 the packet may be marked accordingly and it may be determined whether to admit the new flow to the network based on network statistics which may comprise: past and present flow-counts in the network, past and present flow-setup-rates in the network, past and present network bandwidth utilized, and past and present network bandwidth available. In this manner, the algorithm may allow for restricting network access for the marked packets while allowing unmarked packets into the network unrestricted. In step 224, if it is determined to admit the packet to the network then the algorithm proceeds to step 228.

In a computer network, such as the network 10 described in FIG. 1A, aspects of the invention may be found in a method and system for extracting an identifier from flows arriving at a network node, such as the node 100 described in FIG. 1C, and regulating the flows based on the identifier. In this regard, the flow identifier may comprise one more of the following: the packet's source IP address, the packet's destination IP address, the packet's source MAC address, the packet's destination MAC address, the packet's network protocol. In the event that the network protocol is a port based one such as TCP or UDP, the flow identifier may further comprise the packet's source port number and/or the packet's destination port number.

In controlling a flow's access to the network, aspects of the invention may comprise limiting the number of flows a source, such as the system 150 described in FIG. 1B, may setup in the network, and the rate at which a source may establish new flows (flow-setup-rate) in the network. In this regard, access control may be based on trends associated with the establishment of flows by one or more sources. Various aspects of the invention may implement flow-count limits and flow-setup-rate limits for sources and/or source-types and may store one or more of these limits in a memory such as memory 103 described in FIG. 1C. In this manner, the memory 103 may comprise one or more databases such as the MAC-to-IP database 102, the flow-record database 104, and the flow-limits database 106 described in FIG. 1B.

Other aspects of the invention, may allow for marking packets received when a source/source-type, such as the system 150, exceeds the maximum allowable flow-count and/or maximum allowable flow-setup-rate. In this regard, the determination to admit these marked packets to the network may be based on any number of network statistics such as: past/present flow-counts in the network, past/present flow-setup-rates in the network, past/present network bandwidth utilized, and past/present network bandwidth available. Furthermore, marked packets may receive further processing in the form of monitoring and/or policing before they are admitted to the network.

Aspects of the invention may be implemented as tables or databases, such as the MAC-to-IP database 102, the flow-record database 104, and the flow-limits database 106 described in FIG. 1B, which may be stored in a machine readable storage such as the memory 103. In this regard, aspects of the invention may allow for marking packets received while one or more of the databases are full. Additionally, the determination to admit these marked packets to the network may be based on any number of network statistics such as: past/present flow-counts in the network, past/present flow-setup-rates in the network, past/present network bandwidth utilized, and past/present network bandwidth available. Marked packets may receive further processing in the form of monitoring and/or policing before they are admitted to the network. Various aspects of the invention may be implemented by one or more processors that may be integrated within a network node, a network switching device, a network interface card or chip, and/or any network routing device within the network 100.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing packets in a communication system, the method comprising:
   in a communication device:
      selectively marking one or more packets based on a flow identifier associated with said one or more packets, and in response to one or both of:
         a number of flows in a network that are associated with a source meeting a maximum number of flows, and
         a rate at which said source is attempting to establish flows in said network meeting a maximum rate;
      determining whether said one or more packets are marked;
      in response to determining that said one or more packets are marked, determining whether to forward said one or more packets to said network based at least in part on at least one network-level statistic of said network; and
      in response to determining that said one or more packets are unmarked, forwarding said one or more packets to said network.

2. The method according to claim 1, wherein said flow identifier comprises one or more of the following: a source IP address, a destination IP address, a source MAC address, a destination MAC address, a network protocol, and where applicable a source port number, and a destination port number.

3. The method according to claim 1, wherein said maximum number of flows is different for different sources.

4. The method according to claim 1, wherein said at least one network-level statistic comprises past network statistics.

5. The method according to claim 1, wherein said at least one network-level statistic comprises present network statistics.

6. The method according to claim 1, wherein said maximum rate is different for various sources.

7. The method according to claim 1, wherein said at least one network-level statistic comprises one or both of: a count of past flows and a count of present flows in said network.

8. The method according to claim 1, wherein said at least one network-level statistic comprises one or both of: past utilization of bandwidth and present utilization of bandwidth in said network.

9. The method according to claim 1, comprising, in instances that said one or more packets are associated with a flow not previously established in said network, marking said one or more packets when one or more nodes within said network does not have sufficient resources to handle a new flow.

10. A non-transitory computer-readable storage having stored thereon, a computer program having at least one code section for processing packets in a communication system, the at least one code section being executable by a computer for causing the computer to perform steps comprising:
selectively marking one or more packets based on a flow identifier associated with said one or more packets, and in response to one or more of:
a number of flows in a network that are associated with a source meeting a maximum number of flows; and
a rate at which said source is attempting to establish flows in said network meeting a maximum rate;
determining whether said one or more packets are marked;
in response to determining that said one or more packets are marked, determining whether to forward said one or more packets to said network based at least in part on at least one network-level statistic of said network; and
in response to determining that said one or more packets are unmarked, forwarding said one or more packets to said network.

11. The non-transitory computer readable storage according to claim 10, wherein said flow identifier comprises one or more of the following: a source IP address, a destination IP address, a source MAC address, a destination MAC address, a network protocol, and where applicable, a source port number, and a destination port number.

12. The non-transitory computer-readable storage according to claim 10, wherein said maximum number of flows is different for different sources.

13. The non-transitory computer-readable storage according to claim 10, wherein said at least one network-level statistic comprises past network statistics.

14. The non-transitory computer-readable storage according to claim 10, wherein said at least one network-level statistic comprises present network statistics.

15. The non-transitory computer-readable storage according to claim 10, wherein said maximum rate is different for various sources.

16. The non-transitory computer-readable storage according to claim 10, wherein said at least one network-level statistic comprises one or both of: a count of past flows and a count of present flows in said network.

17. The non-transitory computer-readable storage according to claim 10, wherein said at least one network-level statistic comprises one or both of: past utilization of bandwidth and present utilization of bandwidth in said network.

18. The non-transitory computer-readable storage according to claim 10, wherein at least one code section comprises code for, in instances that said one or more packets are associated with a flow not previously established in said network, marking said one or more packets when one or more nodes within said network does not have sufficient resources to handle a new flow.

19. A system for processing packets, the system comprising:
one or more circuits that are operable to:
selectively mark one or more packets based on a flow identifier associated with said one or more packets, and in response to one or both of:
a number of flows in a network that are associated with a source meeting a maximum number of flows; and
a rate at which said source is attempting to establish flows in said network;
determine whether said one or more packets are marked;
in response to determining that said one or more packets are marked, determine whether to forward said one or more packets to said network based at least in part on at least one network-level statistic of said network; and
in response to determining that said one or more packets are unmarked, forward said one or more packets to said network.

20. The system according to claim 19, wherein said flow identifier comprises one or more of the following: a source IP address, a destination IP address, a source MAC address, a destination MAC address, a network protocol, and where applicable, a source port number, and a destination port number.

21. The system according to claim 19, wherein said maximum number of flows is different for different sources.

22. The system according to claim 19, wherein said at least one network-level statistic comprises past network statistics.

23. The system according to claim 19, wherein said at least one network-level statistic comprises present network statistics.

24. The system according to claim 19, wherein said maximum rate is different for various reasons.

25. The system according to claim 19, wherein said at least one network-level statistic comprises one or both of: a count of past flows and a count of present flows in said network.

26. The system according to claim 19, wherein said at least one network-level statistic comprises one or both of: past utilization of bandwidth and present utilization of bandwidth in said network.

27. The system according to claim 19, wherein said one or more circuits are operable to, in instances that said one or more packets are associated with a flow not previously established in said network, mark said one or more packets when one or more nodes within said network does not have sufficient resources to handle a new flow.

28. The system according to claim 19, wherein said one or more circuits is integrated in at least one of: a switching device, a network interface card or chip, and a routing device.

29. A system for processing packets, the system comprising:
means for selectively marking one or more packets based on a flow identifier associated with said one or more packets, and in response to one or both of:
a number of flows in a network that are associated with a source meeting a maximum number of flows, and
a rate at which said source is attempting to establish flows in said network meeting a maximum rate;
means for determining whether said one or more packets are marked;
means for determining whether to forward said one or more packets to said network based at least in part on at least one network-level statistic of said network in response to determining that said one or more packets are marked; and
means for forwarding said one or more packets to said network in response to determining that said one or more packets are unmarked.

* * * * *